United States Patent
Bhaduri et al.

(10) Patent No.: US 10,017,837 B2
(45) Date of Patent: Jul. 10, 2018

(54) METALLURGICAL EXTRACTION TECHNIQUE TO RECOVER PLATINUM GROUP METALS FROM A FILTER CAKE

(71) Applicants: Rahul Shankar Bhaduri, Moraga, CA (US); Hye Kyung Cho Timken, Albany, CA (US)

(72) Inventors: Rahul Shankar Bhaduri, Moraga, CA (US); Hye Kyung Cho Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 719 days.

(21) Appl. No.: 14/521,211

(22) Filed: Oct. 22, 2014

(65) Prior Publication Data
US 2016/0115567 A1 Apr. 28, 2016

(51) Int. Cl.
C22B 11/08 (2006.01)
C22B 3/46 (2006.01)
(Continued)

(52) U.S. Cl.
CPC ............... *C22B 11/08* (2013.01); *C22B 3/46* (2013.01); *C22B 7/009* (2013.01); *C22B 11/048* (2013.01); *Y02P 10/214* (2015.11); *Y02P 10/234* (2015.11)

(58) Field of Classification Search
None
See application file for complete search history.

(56) References Cited

U.S. PATENT DOCUMENTS 4,009,103 A  2/1977 Burke
5,160,711 A * 11/1992 Atkinson ............. B01J 23/96
                                                   423/213.5
(Continued)

FOREIGN PATENT DOCUMENTS

GB  922021    3/1963
GB  922021 A * 3/1963  ............ B01J 23/96

OTHER PUBLICATIONS

Shams K et al: 11 Platinum recovery from a 1-25 spent industrial dehydrogenation catalyst using cyanide leaching to 11 owed by ion exchange 11 App li ed Catalysis A: General, Els ev i er Science, Amsterdam, NL, vol. 258, No. 2, Feb. 20, 2004 (Feb. 20, 2004), pp. 227-234.

*Primary Examiner* — Melissa S Swain
(74) *Attorney, Agent, or Firm* — Susan M. Abernathy

(57) ABSTRACT

This application provides a metallurgical extraction technique, comprising:
a) re-pulping a feed filter cake to make a filter cake slurry;
b) grinding the filter cake slurry;
c) leaching the ground filter cake slurry in a hot alkaline cyanide solution to provide dissolved platinum group metals;
d) liquid-solid separating of the dissolved platinum group metals; and
e) recovering the dissolved platinum group metals by cementing the dissolved platinum group metals with a precipitating metal comprising an aluminum or a zinc; wherein the feed filter cake has the platinum group metals at a total amount from 0.1 to 1.5 wt % and a halide anion content from zero to less than 4 wt %. This application provides a process for platinum group metal recovery, comprising: converting a catalyst which was in contact (Continued)

with a water reactive ionic liquid catalyst into a non-water reactive filter cake and extracting the platinum group metals.

25 Claims, 2 Drawing Sheets

(51) Int. Cl.
*C22B 3/00* (2006.01)
*C22B 7/00* (2006.01)

(56) References Cited

U.S. PATENT DOCUMENTS

| | | | |
|---|---|---|---|
| 5,215,575 A * | 6/1993 | Butler | C22B 3/04 |
| | | | 423/22 |
| 6,770,249 B1 * | 8/2004 | Hoboy | C22B 3/46 |
| | | | 423/109 |
| 7,658,895 B2 | 2/2010 | Bhaduri | |
| 7,837,960 B2 | 11/2010 | Bhaduri et al. | |
| 7,846,404 B2 | 12/2010 | Bhaduri et al. | |
| 8,628,735 B2 | 1/2014 | Bhaduri | |
| 8,673,800 B2 | 3/2014 | Timken et al. | |
| 8,815,184 B2 | 8/2014 | Bhaduri et al. | |
| 8,815,185 B1 | 8/2014 | Bhaduri et al. | |
| 2005/0081683 A1 * | 4/2005 | Lewins | C22B 1/02 |
| | | | 75/744 |
| 2007/0142215 A1 | 6/2007 | Harris et al. | |
| 2009/0226352 A1 | 9/2009 | Hsu et al. | |
| 2012/0039777 A1 | 2/2012 | Bhaduri et al. | |
| 2014/0039231 A1 | 2/2014 | Timken et al. | |

\* cited by examiner

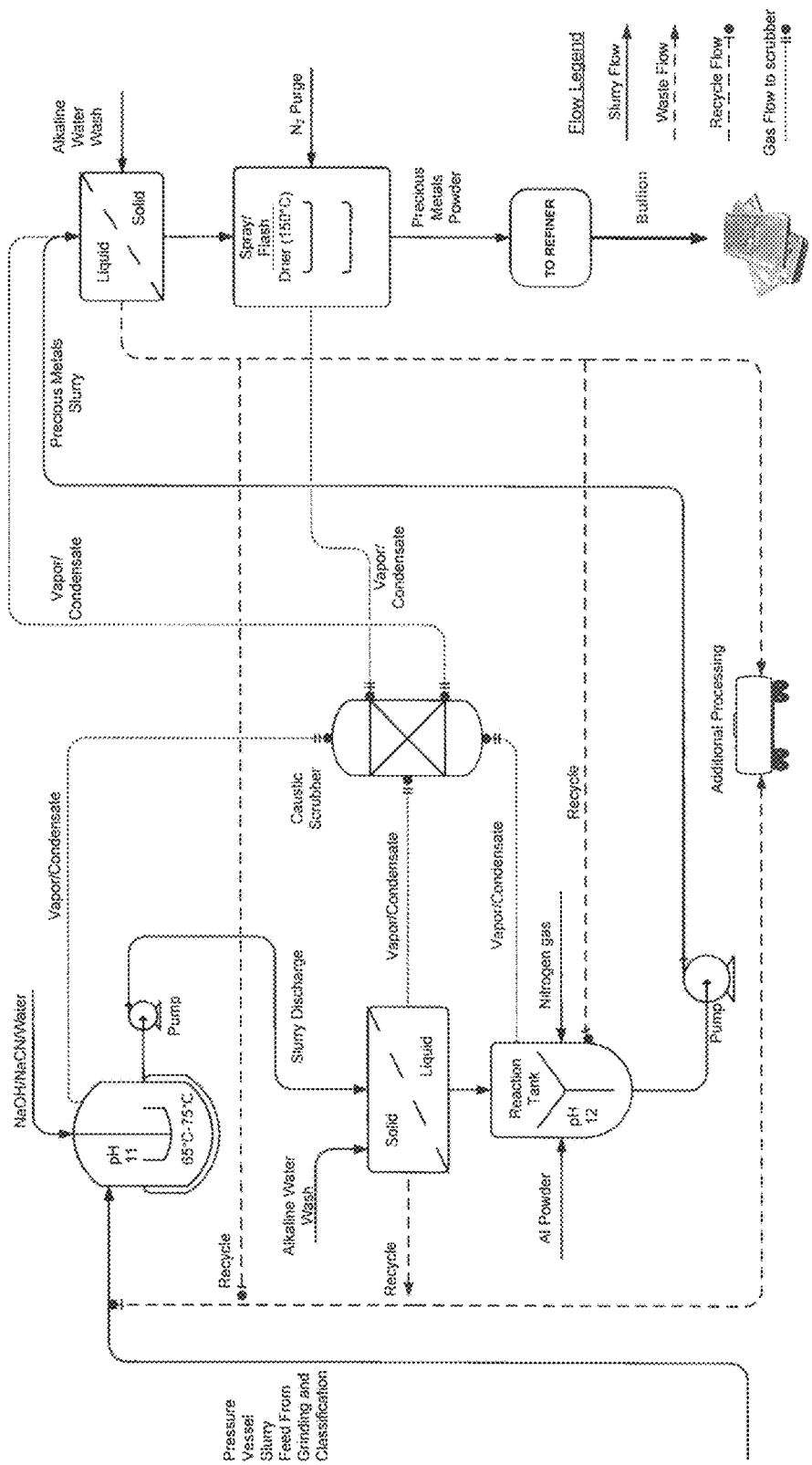

METALLURGICAL EXTRACTION TECHNIQUE TO RECOVER PLATINUM GROUP METALS FROM A FILTER CAKE

This application is related to a co-filed application, titled "PROCESS FOR PREPARING A SPENT CATALYST FOR PRECIOUS METALS RECOVERY", herein incorporated in its entirety.

TECHNICAL FIELD

This application is directed to metallurgical extraction techniques including grinding, leaching, and cementing to recover platinum group metals from a filter cake.

BACKGROUND

Improved processes for recovering platinum group metals from filter cakes are needed.

SUMMARY

This application provides a metallurgical extraction technique, comprising:
 a) re-pulping a feed filter cake to make a filter cake slurry;
 b) grinding the filter cake slurry to make a ground filter cake slurry;
 c) leaching the ground filter cake slurry in a hot alkaline cyanide solution to provide dissolved platinum group metals;
 d) liquid-solid separating of the dissolved platinum group metals; and
 e) recovering the dissolved platinum group metals by cementing the dissolved platinum group metals with a precipitating metal comprising an aluminum or a zinc to make a cemented filter cake; wherein the feed filter cake has the platinum group metals at a total amount from 0.1 to 1.5 wt % and a halide anion content from zero to less than 4 wt %.

This application also provides a process for platinum group metal recovery, comprising: converting a platinum group metal-containing solid catalyst which was in contact with a water reactive ionic liquid catalyst into a non-water reactive filter cake and extracting the platinum group metals from the non-water reactive filter cake.

The present invention may suitably comprise, consist of, or consist essentially of, the elements in the claims, as described herein.

BRIEF DESCRIPTION OF THE DRAWINGS

FIG. 2 is a drawing of a conceptual processing schematic for recovering platinum and palladium from washed spent hydro-regeneration catalyst. This figure includes the steps of metal leaching and recovery.

GLOSSARY

Figure 1:
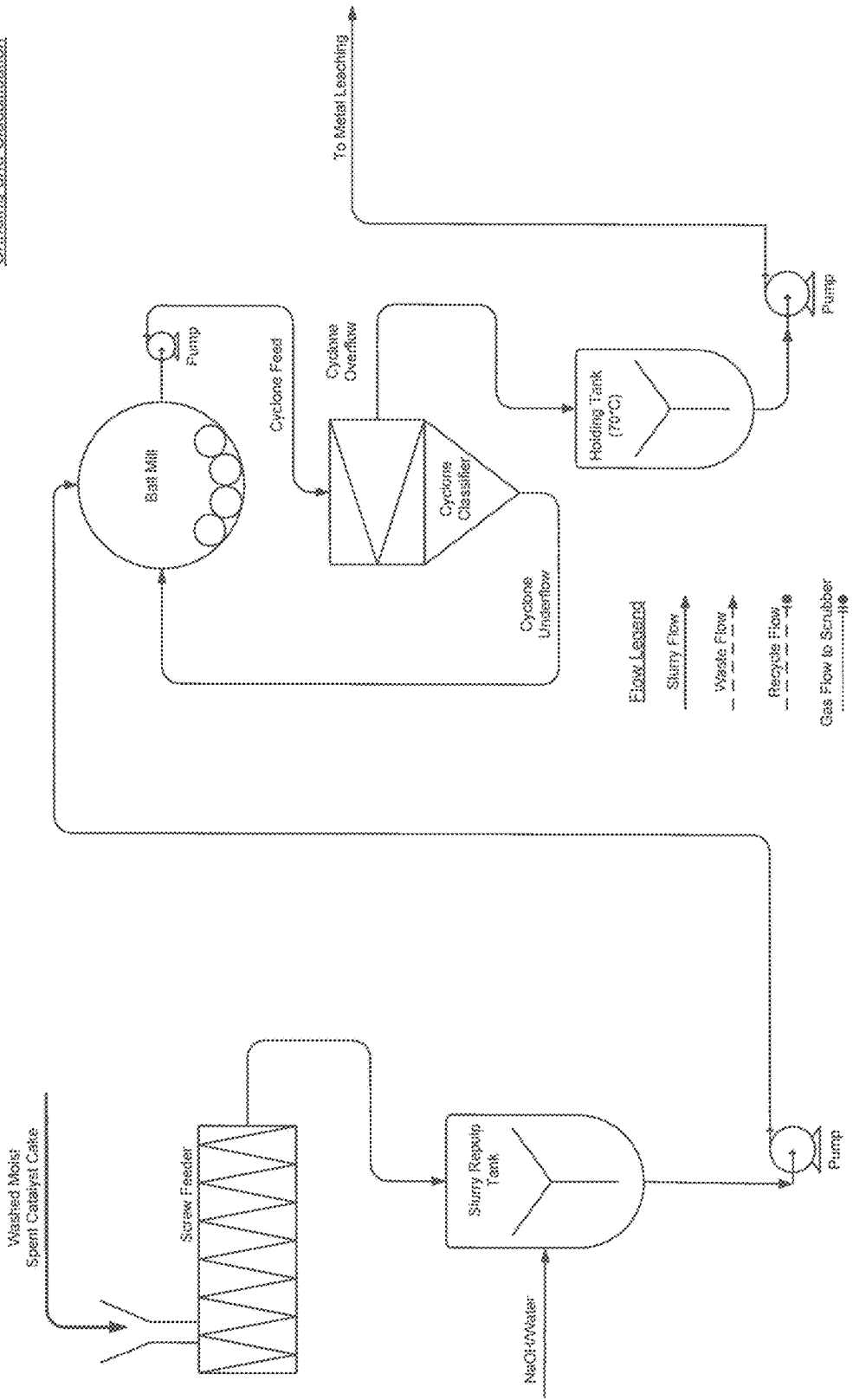
FIG. 1 is a drawing of a conceptual processing schematic for recovering platinum and palladium from washed spent hydro-regeneration catalyst. This figure includes the steps of grinding and classification.

"Re-pulping" refers to mixing consolidated solids with water to produce a slurry capable of being pumped.

"Platinum group metals" (PGMs) are six transitional metal elements that are chemically, physically and anatomically similar. PGMs include iridium (Ir), osmium (Os), palladium (Pd), platinum (Pt), rhodium (Rh), ruthenium (Ru), and mixtures thereof. PGMs can also be referred to as precious metals in the context of this disclosure.

"Base metals" refer to metals that oxidize, tarnish or corrode relatively easily when exposed to air or moisture. Examples of base metals include aluminum, copper, lead, zinc, tin, iron, and nickel.

"Dissolved" refers herein (with reference to a solid) to becoming or caused to become incorporated into a liquid so as to form a solution.

"Room temperature" implies a temperature inside a temperature-controlled building. "Ambient temperature" refers to the temperature of the surroundings and ambient temperature will be the same as room temperature in a temperature-controlled indoor setting. In a temperature-controlled indoor setting, "ambient temperature" denotes the range between 20 and 26° C. (68 and 79° F.), with an average of 23° C. (73° F.).

"Fixed-bed" refers to a reactor configuration wherein the catalyst particles used therein are held in place and do not move with respect to a fixed reference frame. Fixed-bed catalysts are those catalysts that are used in these fixed-bed reactors.

"Caustic solution" refers to an aqueous solution of a hydroxide of a light metal, including NaOH, KOH, and mixtures thereof.

"Alkaline pH" refers to a pH greater than 7.0, wherein pH is defined as the logarithm (base 10) of the reciprocal of the hydrogen ion activity, $a_{H^+}$, in a solution; as described in the following equation:

$$pH = -\log_{10}(a_{H^+}) = \log_{10}\left(\frac{1}{a_{H^+}}\right)$$

"ppmw" refers to parts per million by weight.

"Hydro-regeneration" refers to a hydrogenation reaction used to remove contaminants such as conjunct polymer from a used ionic liquid catalyst to improve the catalyst activity.

"Liquid-solid separation" refers to the separation of two phases, solid and liquid, from a suspension.

"Filter cake" refers to collected solids from a feed side of a filter medium from a filtration device.

"Filtration device" refers to equipment that collects solids on a feed side of a filter medium while filtrate liquid is forced through the filter medium and carried away on the leeward side of the filter medium. Suitable filtration devices and filter mediums are described in "Liquid Filtration", Nicholas P. Cheremisinoff, Butterworth-Heinemann, 1998.

"Filter aids" are inert materials that can be used in filtration pretreatment to improve filtration properties such as filtration rate and filter cake quality. The filter aids can be collected in a filter cake.

"Ionic liquid" refers to materials consisting entirely of ions that are liquid below 100° C.

"Free cyanide" is a measure of the cyanide present as HCN or CN⁻ anion, or the concentration of cyanide anion present in solution in excess of that calculated stoichiometrically as necessary to form a specified complex ion with a metal or metals present in solution.

"Classification" refers to sizing operations that exploit the differences in settling velocities exhibited by particles of different size.

DETAILED DESCRIPTION

As described previously, the metallurgical extraction technique comprises:

a) re-pulping a feed filter cake to make a filter cake slurry;

b) grinding the filter cake slurry to make a ground filter cake slurry;

c) leaching the ground filter cake slurry in a hot alkaline cyanide solution to provide dissolved platinum group metals;

d) liquid-solid separating of the dissolved platinum group metals; and e) recovering the dissolved platinum group metals by cementing the dissolved platinum group metals with a precipitating metal comprising an aluminum or a zinc to make a cemented filter cake; wherein the feed filter cake has the platinum group metals at a total amount from 0.1 to 1.5 wt % and a halide anion content from zero to less than 4 wt %.

In one embodiment, the metallurgical extraction technique described above additionally comprises, between steps b) and c):

(1) pre-leaching the ground filter cake slurry in a dilute 0.1M to 1.0M sulfuric acid solution at a pre-leach pH from 1.8 to 2.2 for a pre-leach time from 5 to 60 minutes at ambient temperature to partially remove base metals;

(2) performing a liquid-solid separation to collect a pre-leached filter cake, and (3) re-pulping the pre-leached filter cake in alkaline water. The pre-leaching can improve the ground filter cake slurry by removing the base metals and concentrating the platinum group metals. In one embodiment, by performing the pre-leaching, from at least 30 wt % to 100 wt % of the base metals are removed and from greater than 60 wt % to 99 wt % of the platinum group metals in the filter cake are recovered.

The feed filter cake has a sufficiently high enough level of platinum group metals to make further metallurgical extraction economical. The feed filter cake also has a low amount of halide anions. The feed filter cake has the platinum group metals at a total amount from 0.1 to 1.5 wt % and a halide anion content from zero to less than 4 wt %. The total amount of the platinum group metals and the halide anion content are measured on a dry solids basis. In one embodiment, the filter cake has from 0.1 to 1.5 wt % total platinum group metals on a dry solids basis. The filter cake also has a halide anion content from zero to less than 4 wt % on a dry solids basis. Halide anions include fluoride (F), chloride (CF), bromide (Br) and iodide (F).

Grinding:

The grinding can be done in a mill. Every mill has a throughput versus recovery curve—based on different target grind sizes often expressed as P80 i.e., 80% of particles being under a certain size when they exit. In one embodiment the grinding of the filter cake is to a P80 of 50 to 150 microns, such as a P80 of 74 microns. In one embodiment, the grinding provides a final particle size of from 20 to 200 microns, or from 45 to 150 microns, in the ground filter cake slurry.

In one embodiment, the grinding employs a ball mill and a cyclone classifier. An underflow slurry from the cyclone classifier can be recycled back to the ball mill with the classified cyclone overflow slurry reporting to the leach circuit.

Leaching:

The chemical reactions involving noble metal oxide dissolution in cyanide solutions to form soluble cyano complexes are given below; the spent catalyst support material, such as alumina or clay, will remain in the solids phase:

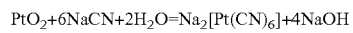

$PtO_2 + 6NaCN + 2H_2O = Na_2[Pt(CN)_6] + 4NaOH$

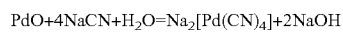

$PdO + 4NaCN + H_2O = Na_2[Pd(CN)_4] + 2NaOH$

Under optimum conditions, nearly all of Pt & Pd in the filter cake will leach into the cyanide solution with dissolution approaching 100%. In one embodiment, the Platinum metal extraction in a cyanide form is greater than 50 wt %, such as from 80 to 99 wt %. In one embodiment, the Palladium metal extraction in a cyanide form is greater than 50 wt %, such as from 80 to 99 wt %.

In one embodiment, the leaching of the ground filter cake slurry is performed at an elevated leaching temperature. The leaching temperature can be above ambient temperature, such as from 35 to 100° C. or from 50 to 95° C.

In one embodiment, the leaching of the ground filter cake slurry occurs over a leaching retention time that is long enough to dissolve from greater than 40 wt % to 100 wt % of the platinum group metals in the filter cake. For example, the leaching retention time can be greater than 20 minutes, greater than 30 minutes, or greater than 45 minutes. Examples of ranges of effective leaching retention times that can be used are from 60 to 360 minutes, or from 30 to 3,000 minutes.

In one embodiment, the hot alkaline cyanide solution used for the leaching has a free cyanide content that is high enough to dissolve all platinum group metals as well as base metals that form complexes with cyanide ions.

In one embodiment, from greater than 40 wt % to 100 wt % of the platinum group metals in the filter cake is dissolved. For example the free cyanide content can be greater than 100 ppmw, such as from 1,000 to 10,000 ppmw, or from 100 ppmw to 25,000 ppmw.

In one embodiment, the hot alkaline cyanide solution has a pH greater than 9, such as from 10 to 13 or from 10.5 to 12.5. The pH is selected to provide the optimal dissolution of the platinum group metals in the filter cake under the conditions of the leaching.

In one embodiment, the hot alkaline cyanide solution is made by adding greater than 3 grams of sodium cyanide (NaCN) per liter of water. An example of a range of NaCN that could be added is from 5 to 15 grams of NaCN per liter of water.

In one embodiment, the filter cake comprises a washed spent catalyst. In this embodiment, the leaching can be done by mixing a washed and ground spent catalyst at greater than 3 wt % solids, such as from 5 to 30 wt % solids, in the hot alkaline cyanide solution.

Liquid-Solid Separating:

The liquid-solid separating can be done using any device or combination of devices that effectively separates the dissolved platinum group metals from the ground filter cake slurry that has been leached. There are a number of types of liquid-solid separating devices including:

Gravity settlers, e.g., clarifiers, lamella separators, settling tanks, and thickeners;

Sedimenting centrifuges, e.g., tubular bowl, skimmer pipe, disc, scroll discharge;

Pressure filters, e.g., Nutsche;

Filters with compression, e.g., belt press, membrane plate and frame, screw press; and Vacuum filters, e.g., top/bottom fed drum, disc, leaf, belt, pan, precoat drum.

In one embodiment, the liquid-solid separating is done with a plate and frame filter press. In another embodiment a filter aid is used during the liquid-solid separating.

Recovering by Cementing:

The dissolved platinum group metals are recovered by cementing the dissolved platinum group metals in cyanide solution with a precipitating metal. In one embodiment, the precipitating metal comprises an aluminum or a zinc to make a cemented filter cake. In one embodiment, the platinum group metals comprise Pt, Pd, or a mixture thereof.

The following cementation reactions are projected for the new metallurgical extraction technique using aluminum as the precipitation metal as described above:

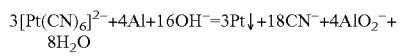

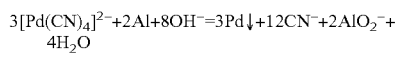

In one embodiment the cementing occurs in a reaction tank with a caustic solution, at a solution pH greater than 10, such as from 10.5 to 13.0. The cementation occurs over a cementing retention time that is sufficient to complete the cementation reactions described previously. Examples of cementing retention times that can be used are from 10 to 120 minutes or from 30 to 90 minutes.

The cementing can be performed at an elevated cementation temperature that is above ambient temperature, such as from 35 to 100° C. or from 50 to 95° C. In one embodiment, the cementation temperature and the leaching temperature are within 0 to 25° C. of each other, or are essentially the same. In one embodiment, a nitrogen gas is introduced into a reaction tank where the cementing occurs.

In one embodiment, the cementing uses an amount of the aluminum that is greater than a stoichiometric platinum group metal content in a reaction tank. Examples of ranges of aluminum that can be used include from 0.50 to 25 times, or 1 to 20 times, above the stoichiometric platinum group metal content in the reaction tank.

In one embodiment, a total Platinum recovery in a metal form from the feed filter cake in step (a) can be from 80 to 98 wt %. In another embodiment, a total Palladium recovery in a metal form from the feed filter cake in step (a) can be from 80 to 98 wt %.

In one embodiment, a cementation precipitate comprising the platinum group metals and base metals is produced. In one embodiment, the cementation precipitate is dumped from the filter & conveyed into a dryer at an elevated temperature, such as about 150° C., to form a free flowing powder.

In one embodiment, a precious metals powder is produced that comprises greater than 15 wt % total platinum group metals. For example, a precious metals powder comprising from 20 to 70 wt % of the platinum group metals can be produced, making the precious metals powder very suitable for refining into bullion.

FIGS. 1 and 2 represent a schematic of one possible embodiment of this invention. As shown in the figures, consolidated washed spent hydro-regeneration catalyst filter cakes are dumped from the press plates & transported to a hopper supplying a screw feeder; the feeder conveys the moist solids into a re-pulp tank for slurrying with fresh water and caustic at 45 wt % solids at a pH of about 11.

The mixed slurry is pumped to a ball mill containing ½-inch & 1-inch spherical steel media, in closed circuit with cyclones for classification. Cyclone feed slurry, at 50-wt % solids, is classified with the cyclone overflow slurry passing a $P_{80}$ of 200-mesh (74-micron) at 25 wt % solids; coarse cyclone underflow slurry returns to combine with ball mill feed for additional particle size reduction.

The cyclone overflow slurry enters a steam jacketed and stirred holding surge tank maintained at about 70° C. The homogenous hot slurry is pumped to an electrically heated (at about 70° C.) and agitated (300 rpm) pressure vessel where sodium cyanide in caustic solution is added up-to 1 wt % (10,000 ppmw) on a dry feed basis. A constant temperature compensated pH of about 11.0 is maintained during the 4-hour leach with intermittent sampling to ensure free cyanide concentrations are above 5,000 ppmw. Gas overpressures in the sealed vessel are slightly above atmospheric due to partial pressure of water vapor.

After leach termination, the system is depressurized and vented to a caustic scrubber; the hot slurry is pumped into a plate and frame filter press located in a vented area to ensure residual emissions capture into a scrubber.

Following an alkaline hot water wash of the plate solids and depending upon precious metal content, the sludge dumped from the press may be recycled to the pressure vessel feed or transferred for further processing.

The press filtrate is directed to a steam jacketed (70° C.) and stirred reaction vessel in which 50 wt % caustic solution is introduced to raise the solution pH to about 12 in the presence of nitrogen gas; aluminum powder (5-8 μm) is then added at 5× above stoichiometric PGM content in solution and given a mix retention time of 1 hour. Nitrogen is introduced to obviate oxygen inclusion in the slurry and preclude the potential of a passivating film of aluminum hydroxide on the aluminum powder. Minimizing Al addition to 5× above stoichiometric PGM content also contributes to suppressing Ni in solution; nickel has the lowest Gibb's free energy of the entire noble and base metals present so Al will preferentially precipitate the PGM's followed by the base metals. The intent was to ensure the presence of sufficient Al for PGM removal from solution and curtail Al consumption occurring as a result of reaction with base metals. Based on free energies, metals precipitation sequence with aluminum appears to follow Pt>Pd>Cu>Fe>Ni. Table 1 highlights free energies of the various PGM & base metal cyanide reactions.

Succeeding precipitation, the hot cementation slurry is pumped to a plate and frame filter press, again located in a vented area to ensure residual emissions capture to a scrubber. The solids are washed with hot alkaline water on the plates, dumped and conveyed to a spray drier under inert gas or $N_2$ purge and at 150° C. The dried cooled powdery residue is transferred to double plastic lined steel drums & shipped for PGM separation and purification to a metals refiner. In excess of 91% and 95% Pd & Pt recoveries respectively, from the spent catalyst filter cake, are achieved.

Contingent on precious metals content of the press filtrate (containing free cyanide, soluble aluminate, and precious/base metal cyanide compounds), the solution may be partially recycled to a) the pressure vessel feed, b) the Al precipitation vessel reaction tank, and c) transferred for further processing.

The dried powder composition approximates 40 wt % as elemental precious metals with the remainder as base metals including aluminum, nickel, copper and iron. A near 125-fold mass reduction in tandem with a 120-fold precious metal concentration increase in the final product, relative to the starting material weight, is apparent after processing the spent catalyst.

TABLE 1

| | $E^0$ | Cell Potential (V) | Free Energy |
|---|---|---|---|
| Pt Reaction | | | |
| $2Al^0 + 8OH^- - 6e = 2AlO_2^- + 4H_2O$ | 2.21 | | |
| $Pt(CN)_6^{2-} + 4e = Pt^0 + 6CN^-$ | 0.10 | $E^0$ | $\Delta G^0$ (kJ/mole) |
| $4Al^0 + 16OH^- + 3Pt(CN)_6^{2-} =$ | | 2.31 | −2,674 |
| $3Pt^0 + 4AlO_2^- + 18CN^- + 8H_2O$ | | | |
| Pd Reaction | | | |
| $2Al^0 + 8OH^- - 6e = 2AlO_2^- + 4H_2O$ | 2.21 | | |
| $Pd(CN)_4^{2-} + 2e = Pd^0 + 4CN^-$ | −0.52 | $E^0$ | $\Delta G^0$ (kJ/mole) |
| $2Al^0 + 8OH^- + 3Pd(CN)_6^{2-} =$ | | 1.69 | −978 |
| $3Pd^0 + 2AlO_2^- + 12CN^- + 4H_2O$ | | | |
| Cu Reaction | | | |
| $2Al^0 + 8OH^- - 6e = 2AlO_2^- + 4H_2O$ | 2.21 | | |
| $6Cu(CN)_3^{2-} + 6e = 6Cu^0 + 18CN^-$ | −0.75 | $E^0$ | $\Delta G^0$ (kJ/mole) |
| $2Al^0 + 8OH^- + 6Cu(CN)_3^{2-} =$ | | 1.46 | −845 |
| $3Cu^0 + 2AlO_2^- + 18CN^- + 4H_2O$ | | | |
| Fe Reaction | | | |
| $2Al^0 + 8OH^- - 6e = 2AlO_2^- + 4H_2O$ | 2.21 | | |
| $Fe(CN)_6^{4-} + 2e = Fe^0 + 6CN^-$ | −0.99 | $E^0$ | $\Delta G^0$ (kJ/mole) |
| $2Al^0 + 8OH^- + 3Fe(CN)_6^{4-} =$ | | 1.22 | −706 |
| $3Fe^0 + 2AlO_2^- + 18CN^- + 4H_2O$ | | | |
| Ni Reaction | | | |
| $2Al^0 + 8OH^- - 6e = 2AlO_2^- + 4H_2O$ | 2.21 | | |
| $3Ni(CN)_4^{2-} + 6e = 3Ni^0 + 12CN^-$ | −1.07 | $E^0$ | $\Delta G^0$ (kJ/mole) |
| $2Al^0 + 8OH^- + 3Ni(CN)_4^{2-} =$ | | 1.14 | −660 |
| $3Ni^0 + 2AlO_2^- + 12CN^- + 4H_2O$ | | | |

Hydro-Regeneration of Ionic Liquid Catalyst:

In one embodiment the filter cake comprises a washed spent catalyst. The washed spent catalyst can be a hydro-regeneration catalyst used to regenerate an ionic liquid catalyst. For example, the washed spent catalyst could have been in contact with a chloroaluminate ionic liquid catalyst or a bromoaluminate ionic liquid catalyst. Ionic liquid catalysts used for hydrocarbon conversions become deactivated during use and require regeneration. The deactivation can be caused by, for example, the build-up of conjunct polymer or other impurities in the ionic liquid catalyst. Regeneration can be achieved in a hydro-regeneration reactor using a hydro-regeneration catalyst. The hydro-regeneration reactor contacts the used ionic liquid catalyst with hydrogen and the hydro-regeneration catalyst to reactivate the used ionic liquid catalyst. The hydro-regeneration removes the impurities, such as conjunct polymer, from the used ionic liquid catalyst, thus increasing the acidity and ability of the ionic liquid catalyst to perform hydrocarbon conversions.

In one embodiment, the hydro-regeneration reaction conditions are performed over a range of hydrogen pressures, for example from about 50 to 5,000 psig. Hydro-regeneration conditions can include temperatures of −20° C. to 400° C., or 50° C. to 300° C.; and total pressures of atmospheric to 5,000 psig, or 50 to 2,500 psig. Hydro-regeneration catalyst contact times with the used chloroaluminate ionic liquid catalyst can be from 1 minute to 24 hours (0.04 to 60 vol/vol/hour), such as 10 minutes to 12 hours. Ratios of hydrogen feed to used chloroaluminate ionic liquid catalyst during the hydro-regeneration can vary from 100 to 10,000 scf $H_2$/bbl of ionic liquid catalyst (17.8 to 1781 cc $H_2$/cc of ionic liquid). A normal hydrocarbon can optionally be used as a solvent in the hydro-regeneration reactor.

Examples of hydro-regeneration of chloroaluminate ionic liquid catalysts, for example, are given in U.S. Pat. No. 7,691,771, U.S. Pat. No. 7,651,970, U.S. Pat. No. 7,678,727, U.S. Pat. No. 7,825,05; and in US Patent Pub. Nos. 20140037512A1, 20140039231A1, 20140066678A1, 201400134065A1, and 20140179977A1.

In one embodiment, a noble metal fixed-bed catalyst used for hydro-regeneration of an acidic ionic liquid catalyst becomes spent over time in service, and is periodically replaced. The spent catalyst that is removed from the hydro-regeneration reactor still comprises the one or more platinum group metals that are valuable and are desired for recovery.

A spent catalyst, such as the one described above used for hydro-regeneration of an acidic ionic liquid catalyst, can be treated to make a filter cake having from 0.1 to 1.5 wt % total platinum group metals, and a halide anion content from zero to less than 4 wt % on a dry solids basis. A process and apparatus that can be used to make these types of filter cakes is described in our co-filed application, titled "PROCESS FOR PREPARING A SPENT CATALYST FOR PRECIOUS METALS RECOVERY".

Spent catalysts that comprise acidic ionic liquid catalysts can be water reactive. For example, chloroaluminate ionic liquid catalysts or bromoaluminate ionic liquid catalysts, such as the one described above used for hydro-regeneration of an acidic ionic liquid catalyst, can be highly water reactive. In one embodiment, the metallurgical extraction technique converts the feed filter cake that is water reactive into non-water reactive products that are much safer to handle. In one embodiment, the feed filter cake has been pre-treated to make the feed filter cake non-water reactive prior to re-pulping. The pre-treatment can comprise washing with an aqueous caustic solution. In one embodiment, the pre-treatment comprises: adding the spent water reactive catalyst to a caustic solution to wash the spent water reactive catalyst, and filtering the resulting wash slurry to collect a non-water reactive feed filter cake.

EXAMPLES

Example 1: Production of Spent Hydro-Regeneration Catalyst

Various ionic liquid catalysts made of metal halides, such as $AlCl_3$, $AlBr_3$, $GaCl_3$, $GaBr_3$, $InCl_3$, and $InBr_3$ could be used for catalytic processes. N-butylpyridinium chloroaluminate ($C_5H_5NC_4H_9Al_2Cl_7$) was the ionic liquid catalyst used in our process. This ionic liquid catalyst had the following composition:

TABLE 1

Composition of Ionic Liquid Catalyst

| Element | Wt % |
|---|---|
| Al | 12.4 |
| Cl | 56.5 |
| C | 24.6 |
| H | 3.2 |
| N | 3.3 |

Refinery isobutane containing 85 wt % isobutane and 15 wt % n-butane was used for this study. A refinery olefin stream containing $C_3$ and $C_4$ olefins from a Fluid Catalytic Cracking Unit (FCC unit) was dried with 13× molecular sieve and isomerized with a $Pd/Al_2O_3$ catalyst at 150° F. and 250 psig in the presence of hydrogen to produce isomerized $C_3$ and $C_4$ olefin feed with the composition shown in Table 2.

TABLE 2

Composition of Isomerized $C_3$ and $C_4$ Olefin Feed

| Composition | Mole % |
|---|---|
| Propane, $C_3$ | 13.3 |
| Propylene, $C_3=$ | 25.4 |
| 1-Butene, 1-$C_4=$ | 2.3 |
| 2-Butene, 2-$C_4=$ | 16.2 |
| Isobutylene, i-$C_4=$ | 6.7 |
| n-Butane, $nC_4$ | 12.4 |
| Isobutane, $iC_4$ | 22.2 |
| $C_5^+$ | 1.6 |
| Sum | 100.0 |

Evaluation of the alkylation of the isomerized $C_3$ and $C_4$ olefin feed with isobutane was performed in a continuously stirred tank reactor. An 8:1 molar mixture of isobutane and olefin was fed to the reactor while vigorously stirring. The ionic liquid catalyst was fed to the reactor via a second inlet port targeted to occupy 4 vol % in the reactor. A small amount of n-butyl chloride was added to produce anhydrous HCl in situ. The average residence time in the reactor (combined volume of feeds and catalyst) was about 12 minutes. The outlet pressure was maintained at 200 psig and the reactor temperature was maintained at 95° F. (35° C.) using external cooling.

The reactor effluent was separated with a coalescing separator into a hydrocarbon phase and an ionic liquid catalyst phase. The hydrocarbon phase was sent to a distillation section to produce multiple streams, including: a $C_3^-$ fraction, an $nC_4$ stream, an $iC_4$ stream, and an alkylate stream. The $iC_4$ stream was recycled back to the alkylation reactor.

About 80 wt % of the ionic liquid catalyst was directly recycled back to the alkylation reactor for repeated use. To maintain the activity of the ionic liquid catalyst, about 20 wt % of the used ionic liquid catalyst was sent to a hydrogenation reactor for reduction of the conjunct polymer level in the ionic liquid catalyst (hydro-regeneration). The conjunct polymer level of the ionic liquid catalyst was maintained at 2 to 5 wt % level with the hydro-regeneration and good alkylate gasoline properties were obtained. The amount of conjunct polymer in the ionic liquid catalyst was determined using an FT-IR quantitation method described in US patent publication No. 20120296145A1.

The hydro-regeneration catalyst contained Pt and Pd hydrogenation metals on an alumina extrudate support. The hydro-regeneration catalyst was kept in operation for 7 months to regenerate the ionic liquid catalyst, and then the hydrogenation unit was shut down. Residual ionic liquid catalyst in the hydrogenation catalyst bed was removed as much as possible by blowing with $H_2$ gas, followed by a thorough isobutane flush, and then a dry $N_2$ purge. The hydrogenation reactor was opened to the atmosphere by opening the top of the reactor vessel and the spent catalyst was vacuumed out. The spent hydro-regeneration catalyst released minute amounts of HCl gas due to hydrolysis of anhydrous $AlCl_3$ in the presence of moisture in the air. The spent catalyst was stored in a closed container with a plastic liner until it was used for metals reclamation studies.

The properties of the fresh ionic liquid catalyst, the fresh hydro-regeneration catalyst, and the spent hydro-regeneration catalyst are shown in Table 3. The metals analyses were performed using digestion techniques followed by inductively coupled plasma (ICP) analysis; the weight percent of C, H, and N were measured with a Carlo-Erba combustion analysis equipment; and the weight percent of S was measured with a Leco combustion analysis equipment. The chloride contents were measured by hydrolyzing the samples in a diluted alkaline solution followed by chloride content determination using a chloride ion-selective-electrode.

TABLE 3

Properties of Fresh Ionic Liquid Catalyst, and Fresh and Spent Hydro-Regeneration Catalysts

| | Fresh Ionic Liquid Catalyst | Fresh Hydrogenation Catalyst | Spent Hydrogenation Catalyst |
|---|---|---|---|
| ICP Test for Metals Analysis | | | |
| Pt, wt % | 0 | 0.18 | 0.11 |
| Pd, wt % | 0 | 0.36 | 0.24 |
| Al, wt % | 12.4 | 49.1 | 25.1 |
| Cu, wt % | 0 | 0 | 0.31 |
| Fe, wt % | 0 | 0.01 | 0.05 |
| Ni, wt % | 0 | 0 | 0.96 |
| Sulfur Analysis with Leco Analyzer | | | |
| S, % | 0 | 0 | 0.42 |
| Carlo-Erba Combustion Analysis | | | |
| C, wt % | 24.6 | 0 | 13.1 |
| H, wt % | 3.2 | 0 | 1.94 |
| N, wt % | 3.3 | 0 | 1.49 |
| Cl Analysis with Cl Selective Electrode | | | |
| Cl, wt % | 56.5 | 0 | 25.3 |
| Sum | 100.0 | 49.7* | 69.0* |

*The summation of fresh & spent hydro-regeneration catalysts was less than 100% since oxygen in the alumina binder was not included in the measurements.

The amounts of C, H, N, and Cl indicated that the spent hydro-regeneration catalyst contained a substantial amount of trapped ionic liquid catalyst. Based on the above elemental analysis, an estimated 30-40 wt % of the spent hydro-regeneration catalyst was trapped ionic liquid catalyst.

The unloaded hydro-regeneration catalyst consisted of solid extrudates with good integrity and no ionic liquid visibility on the external surface. Based on this, it was concluded that the ionic liquid catalyst resided in the pores and in the void space inside the extrudates and that $N_2$ purging and isobutane flushing steps incorporated for the shutdown/unloading process could not remove the ionic liquid catalyst trapped inside the spent hydro-regeneration catalyst extrudate pores.

Although to a less severe extent, the spent hydro-regeneration catalyst exhibited the reactivity behavior of the ionic liquid catalyst in that the spent hydro-regeneration catalyst reacted slowly with moisture in the atmosphere and evolved some HCl gas. When the hydro-regeneration catalyst was added to water, rapid hydrolysis of ionic liquid catalyst occurred and heat was generated due to the hydrolysis. Based on this residual reactivity behavior, it was concluded that the spent hydrogenation catalyst could not be handled as-is by a noble metals reclamation facility since HCl evolution might affect operational personnel at the facility and/or damage the equipment used for the noble metal pyrometallurgical recovery process.

Example 2: Preparation of Washed Catalyst Pellets

Spent 1/16" diameter catalyst pellets, comprising Pt and Pd on an alumina support, from Example 1 were collected from the hydro-regeneration reactor used to regenerate acidic chloroaluminate ionic liquid catalyst that was in turn used for olefin and isoparaffin alkylation to make alkylate gasoline blending component.

The spent catalyst pellets were added to deionized water and the resulting acidic slurry was agitated for 20-minutes and vacuum filtered using a Buchner funnel to produce a filter cake. The filter cake was subsequently rinsed with 5-volumes of deionized (DI) water.

Solutions were analyzed for chlorides, either by selective chloride ion electrode or by titration and/or by ion chromatography on a Dionex IC 25 unit with a carbonate/bicarbonate eluent system on As-12 columns. The filter cake solids underwent borate fusion and/or were digested in acid and assayed for base and precious metal content via ICP using a Thermo Fisher Scientific, Iris Advantage Inductively Coupled Plasma (ICP) spectrometer and a Perkin Elmer 6000 ICP-Mass Spectrometer. Solutions were analyzed for metals by ICP.

The as-is spent hydro-regeneration catalyst pellets and the thoroughly rinsed filter cake had the following compositions as shown in Table 4.

TABLE 4

| | Spent Hydro-regeneration Catalyst | Hydrolyzed/Rinsed Hydro-regeneration Catalyst |
|---|---|---|
| ICP Test for Metals Analysis | | |
| Pt, wt % | 0.11 | 0.11 |
| Pd, wt % | 0.24 | 0.24 |
| Al, wt % | 25.1 | 43.1 |
| Cu, wt % | 0.31 | 0.25 |
| Fe, wt % | 0.05 | 0.06 |
| Ni, wt % | 0.96 | 1.7 |
| Sulfur Analysis with Leco Analyzer | | |
| S, % | 0.42 | 0.51 |
| Carlo-Erba Combustion Analysis | | |
| C, wt % | 13.1 | 23.0 |
| H, wt % | 1.94 | 4.1 |
| N, wt % | 1.49 | 0.1 |
| Chloride Analysis with Cl Selective Electrode | | |
| Cl, wt % | 25.3 | 1.1 |
| sum | 69.0* | 74.3* |

*The summation of spent & washed hydro-regeneration catalysts was less than 100% since oxygen in the alumina binder was not included in the measurements.

The washed and rinsed filter cake retained the Pt and Pd as oxides, together with alumina binder and base metal impurities as insoluble hydroxides. The washed and rinsed filter cakes were no longer water-reactive.

Example 3: Recovery of Noble Metals

Washed spent catalyst from Example 2 is repulped in water to 30-wt % solids & introduced into a lab ball mill. The mill is loaded to 30% of its operating volume with an 80:20 charge of ½" and 1" ceramic balls. Following grinding, the slurry is screened through a 200 Tyler mesh (74-micron) screen and the undersize material is introduced into a 1-gallon Parr autoclave.

With the onset of autoclave agitation, sufficient water and caustic are added to the slurry mix to target a density of 25-wt % solids and pH of 11.0 followed by the addition of 20-lb NaCN per ton of dry feed or 1-wt % of the solids mass on a dry basis. The vessel is sealed, temperature ramped to 70° C. and leaching continues for 4-hours. Intermittent samples are taken during the leach to ensure pH is maintained at about 11 and free cyanide content maintained above 5000-ppmw. Supplemental NaCN and caustic additions are made accordingly during the leach.

Following leaching, the slurry is vacuum filtered through 22-micron pore Whatman filter paper; the residue is washed with three volumes of hot alkaline water to remove entrained soluble species, dried, weighed and a split is submitted for metal assays.

The leach filtrate and wash solutions are weighed and assayed for metal content for mass balance purposes. The wash solution is not combined with the leach filtrate to avoid dilution of PGM content during the Al precipitation step. Commercially, the wash filtrate could be applied as make-up solution to the cyanide leach circuit. Tables 5 and 6 represent metals content in the cyanide leach solution and cyanided residue respectively and Table 7 depicts metal extractions in cyanide.

TABLE 5

Cyanide Solution Metal Composition

| Element | ppmw |
|---|---|
| Pt | 261 |
| Pd | 547 |
| Al | 0 |
| Ni | 3,957 |
| Cu | 582 |
| Fe | 140 |
| Cl | 2,695 |

TABLE 6

Cyanided Residue Metal Composition

| Element | ppmw |
|---|---|
| Pt | 34 |
| Pd | 172 |
| Al | 439,979 |
| Ni | 868 |
| Cu | 128 |
| Fe | 31 |
| C | 234,792 |

TABLE 7

Metal Extractions in Cyanide

| Element | ppmw |
|---|---|
| Pt | 96.9% |
| Pd | 92.5% |
| Al | — |
| Ni | 82.4% |
| Cu | 88.9% |
| Fe | 75.0% |

The leach filtrate is introduced into a wide mouth 4,000-mL round bottomed Kontes flask set-up with an agitator and the flask is placed in a constant temperature waterbath at 70° C. Inlet ports into the flask for adding caustic solution, aluminum powder and nitrogen gas are accessible; following agitation start-up, pH adjustment to 12.0 with caustic and $N_2$ flow, sufficient Al powder is stage-added over 10-minutes. A total reaction time of 60-minutes is determined to be sufficient for reaction completion with >98% of PGM precipitation from solution.

The hot slurry is vacuum filtered through 22-micron pore Whatman filter paper; the residue is washed with ten volumes of hot alkaline water to remove entrained soluble species, dried in an inert gas purged oven at 150° C., weighed and a split is submitted for metal assays.

The barren filtrate and wash solutions are weighed and assayed for metal content for mass balance purposes. Tables 8 and 9 depict the barren filtrate and final dried PGM residue metal contents respectively.

TABLE 8

Barren Cyanide-Aluminate Solution Metal Composition

| Element | ppmw | Pptn Recovery |
|---|---|---|
| Pt | 2.5 | 98.8% |
| Pd | 6 | 98.6% |
| Ni | 2,350 | 14.2% |
| Cu | 10 | 97.7% |
| Fe | 12 | 86.8% |
| Al | 544 | — |

TABLE 9

Dried Powder Metal Composition

| Element | Wt % | % Recovery |
|---|---|---|
| Pt | 13.0% | 95.8% |
| Pd | 27.1% | 91.7% |
| Ni | 25.3% | 12.1% |
| Cu | 27.0% | 87.9% |
| Fe | 5.1% | 69.4% |
| Al | 2.5% | — |

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

It is claimed:

1. A metallurgical extraction technique, comprising:
    a) re-pulping a feed filter cake comprising platinum group metals to make a filter cake slurry;
    b) grinding the filter cake slurry to make a ground filter cake slurry;
    c) leaching the ground filter cake slurry in an alkaline cyanide solution at a leaching temperature from 35 to 99° C. to provide dissolved platinum group metals;
    d) liquid-solid separating of the dissolved platinum group metals; and
    e) recovering the dissolved platinum group metals by cementing the dissolved platinum group metals with a precipitating metal powder comprising an aluminum or a zinc to make a cemented filter cake; wherein the feed filter cake has the platinum group metals at a total amount from 0.1 to 1.5 wt % and a halide anion content from zero to less than 4 wt %.

2. The metallurgical extraction technique of claim 1, additionally comprising, between steps b) and c):
    (1) pre-leaching the ground filter cake slurry in a dilute 0.1M to 1M sulfuric acid solution at a pre-leach pH from 1.8 to 2.2 for a pre-leach time from 5 to 60 minutes at ambient temperature to partially remove base metals;
    (2) performing a liquid-solid separation to collect a pre-leached filter cake, and
    (3) re-pulping the pre-leached filter cake in alkaline water.

3. The metallurgical extraction technique of claim 2, wherein at least 30 wt % of the base metals are removed.

4. The metallurgical extraction technique of claim 1, wherein the grinding provides a final particle size of from 45 to 150 microns.

5. The metallurgical extraction technique of claim 1, wherein the leaching is performed at a leaching temperature from 50 to 95° C.

6. The metallurgical extraction technique of claim 1, wherein the leaching occurs over a leaching retention time of from 60 minutes to 360 minutes.

7. The metallurgical extraction technique of claim 1, wherein the alkaline cyanide solution has a free cyanide content from 1,000 to 10,000 ppmw.

8. The metallurgical extraction technique of claim 1, wherein a pH of the alkaline cyanide solution is from 10.5 to 12.5.

9. The metallurgical extraction technique of claim 1, wherein the leaching is done by mixing the ground filter cake slurry at 5 to 30 wt % solids in the alkaline cyanide solution.

10. The metallurgical extraction technique of claim 1, wherein a platinum metal extraction in a cyanide form during the leaching is from 80 to 99 wt % of the platinum in the feed filter cake.

11. The metallurgical extraction technique of claim 1, wherein a palladium metal extraction in a cyanide form during the leaching is from 80 to 99 wt % of the palladium in the feed filter cake.

12. The metallurgical extraction technique of claim 1, wherein the precipitating metal comprises the aluminum.

13. A metallurgical extraction technique, comprising:
  a) re-pulping a feed filter cake comprising platinum group metals to make a filter cake slurry;
  b) grinding the filter cake slurry to make a ground filter cake slurry;
  c) leaching the ground filter cake slurry in an alkaline cyanide solution at a leaching temperature greater than an ambient temperature to provide dissolved platinum group metals;
  d) liquid-solid separating of the dissolved platinum group metals;
  e) recovering the dissolved platinum group metals by cementing the dissolved platinum group metals with a precipitating metal comprising an aluminum or a zinc to make a cemented filter cake; wherein the feed filter cake has the platinum group metals at a total amount from 0.1 to 1.5 wt % and has a halide anion content from zero to less than 4 wt %; and
  wherein the cementing occurs in a reaction tank with a caustic solution, at a solution pH from 10.5 to 13.0.

14. The metallurgical extraction technique of claim 1, wherein the cementing occurs over a cementing retention time from 30 to 90 minutes.

15. The metallurgical extraction technique of claim 12, wherein the cementing uses an amount of the aluminum that is from 1 to 20 times above a stoichiometric platinum group metal content in a reaction tank.

16. The metallurgical extraction technique of claim 1, wherein the cementing is performed at a cementation temperature from 50 to 95° C.

17. The metallurgical extraction technique of claim 1, wherein a total platinum recovery is in a metal form in the cemented filter cake, and the total platinum recovery is from 80 to 98 wt % of the platinum in the feed filter cake.

18. The metallurgical extraction technique of claim 1, wherein a total palladium recovery is in a metal form in the cemented filter cake, and the total palladium recovery is from 80 to 98 wt % of the palladium in the feed filter cake.

19. The metallurgical extraction technique of claim 1, wherein a nitrogen gas is introduced into a reaction tank where the cementing occurs.

20. The metallurgical extraction technique of claim 1, wherein the feed filter cake comprises a washed spent catalyst.

21. The metallurgical extraction technique of claim 20, wherein the washed spent catalyst had been in contact with a chloroaluminate ionic liquid catalyst or a bromoaluminate ionic liquid catalyst.

22. The metallurgical extraction technique of claim 1, wherein the alkaline cyanide solution is made by adding from 5 to 15 grams of NaCN per liter of water.

23. The metallurgical extraction technique of claim 1, wherein the platinum group metals comprise Pt, Pd, or a mixture thereof.

24. The metallurgical extraction technique of claim 1, wherein a cementation precipitate comprising the platinum group metals and base metals is produced.

25. The metallurgical extraction technique of claim 24, additionally comprising conveying the cementation precipitate to a dryer to form a free flowing powder, wherein the free flowing powder comprises from 20 to 70 wt % of the platinum group metals.

* * * * *